Patented Aug. 6, 1940

2,210,588

UNITED STATES PATENT OFFICE 2,210,588

PROCESS OF PREPARING IMIDAZOLINES

Georg Kränzlein and Herbert Bestian, Frankfort-on-the-Main, Germany, assignors, by mesne assignments, to General Aniline & Film Corporation, New York, N. Y., a corporation of Delaware No Drawing. Application August 11, 1938, Serial No. 224,326. In Germany August 23, 1937

11 Claims. (Cl. 260—309)

The present invention relates to a process of preparing compounds containing nitrogen, more particularly, it relates to a process of preparing compounds containing at least two imidazoline ring systems substituted in 2-position, especially those which can be derived from aliphatic diamines.

In the copening U. S. patent application Serial No. 195,978 for "Process of preparing imidazolines" of Georg Kränzlein, Herbert Bestian and Walter Schnurr, there is described a process for making imidazolines which, on account of its easy procedure and good yields, is particularly suitable for the synthesis of imidazolines substituted in 2-position and constitutes a considerable technical advance in comparison with the known processes of manufacture of imidazolines. That process consists in heating to a high temperature N.N′-ethylene-urea or a derivative thereof with a mono-carboxylic acid other than formic acid.

Now, we have found that the corresponding compounds containing two or more imidazoline ring systems in the molecule may be obtained in a smooth reaction when di- and poly-carboxylic acids having at least 8 carbon atoms are used instead of the mono-carboxylic acids. The reaction occurs with elimination of water and carbon dioxide and corresponds, for instance, in the case of a di-carboxylic acid and ethylene urea, with the following scheme:

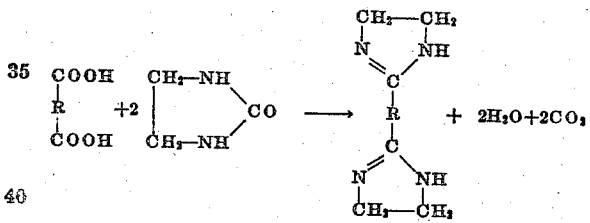

wherein R means an organic radical having at least 6 carbon atoms. In the preferred method the di- or polycarboxylic acids having at least 8 carbon atoms are heated with the calculated amount or with an excess of ethylene-urea slowly to 300° C. or to a temperature above 300° C. and then this temperature is maintained for several hours.

The compounds containing two or more imidazoline ring systems in the molecule formed may, if necessary, be distilled or sublimed under reduced pressure, in order to separate therefrom higher condensation products of the ethylene-urea and the di- or poly-carboxylic acids, which may have been formed as by-products. They are well-crystallized di- or poly-basic compounds, which are distinguished from the mono-imidazolines by their higher melting point and by their lower solubility in water and organic solvents. Their salts are very easily soluble in water.

The compounds containing two or more imidazoline ring systems in the molecule obtainable according to the present invention are intended to be used as parent materials for the manufacture of textile adjuvants, or softening agents, or they may also be used themselves as such.

The following examples serve to illustrate the invention, but they are not intended to limit it thereto, the parts being by weight:

1. 17.4 parts of suberic acid and 25.8 parts of N.N′-ethylene-urea are melted together in an apparatus mainly consisting of glass with ground joints and then slowly heated to a temperature of 300° C. At 240° C., the formation of the imidazoline rings sets in, water and carbon dioxide being eliminated. The water is distilled by means of a fractionating column. After 7 hours' heating to 300° C., the feebly yellow melt, which solidifies to a crystalline mass on cooling and dissolves in dilute acids to a clear solution, is distilled under reduced pressure. After a small first runnings the omega.omega′-hexamethylene-di-imidazoline-(2) formed distils, under a pressure of 2.5 mm. and a temperature of 225° C. to 240° C., with a yield of 85 per cent in the form of a nearly colorless liquid immediately crystallizing on cooling. The main quantity passes over at a temperature between 225° C. and 230° C. The omega.omega′-hexamethylene-di-imidazoline-(2) dissolves sparingly in acetone, ethyl acetate, benzene and ether; it is soluble in hot water and chloroform, and easily soluble in glacial acetic acid and alcohol. Recrystallized from alcohol, the compound is obtained in the form of rough, short spades melting between 192° C. and 194° C. The aqueous suspension of the compound is strongly alkaline to phenolphthalein. From the aqueous solutions of its salts the base may be freed by means of alkali.

2. 47 parts of azelaic acid and 64.5 parts of N.N′-ethylene-urea are melted together in an apparatus mainly consisting of glass with ground joints and slowly heated, while stirring, to 300° C. At 230° C., the formation of the imidazoline rings sets in, water and carbon dioxide being eliminated. The water is distilled by means of a laterally connected fractionating column. After a 5 hours' heating at 300° C., a feebly yellow melt is obtained, which crystallizes on cooling and dissolves in dilute acids to a clear solution. After distillation under reduced pressure, the omega.omega' - hepta - methylene - di - imidazoline-(2) is obtained, with a yield of 80 per cent. in the form of a nearly colorless liquid passing over at a temperature between 230° C. and 250° C. under a pressure of 3 mm., which immediately solidifies to a crystalline mass on cooling. The main quantity passes over between 235° C. and 240° C. The compound obtained is easily soluble in alcohol, chloroform and glacial acetic acid, sparingly soluble in acetone, ethyl acetate, carbon tetrachloride, benzene, ether and water. Recrystallized from chloroform, the omega.omega' - heptamethylene - di - imidazoline - (2) is obtained in the form of small irregular tables melting at 158° C. to 159° C. The aqueous suspension of the compound is strongly alkaline and colors phenolphthalein paper intensely red.

3. 404 parts of sebacic acid and 400 parts of N.N'-ethylene-urea are melted together in an apparatus mainly consisting of glass with ground joints and heated, in the course of 2 hours, to 300° C. At 230° C., the formation of the imidazoline rings sets in, water and carbon dioxide being eliminated. The water is distilled off by means of a laterally connected fractionating column. In the course of 3 further hours, the temperature is raised to 320° C. and then maintained at 320° C. for 2 hours. The light-yellow melt immediately solidifies to a crystalline mass on cooling and dissolves in dilute acids to a clear solution. In order to eliminate higher condensation products formed, the contents of the flask are distilled under reduced pressure. After a small first runnings, the omega.omega'-octamethylene-di-imidazoline-(2) passes over, at a temperature of 270° C. to 280° C. under a pressure of 4 mm. with a yield of about 70 per cent of the theoretical (calculated upon the amount of sebacic acid used) in the form of a nearly colorless oil immediately crystallizing on cooling. The compound is sparingly soluble in water, acetone, ethyl acetate, benzene and ether, somewhat more easily soluble in chloroform, easily soluble in chlorobenzene and in alcohol. Recrystallized from alcohol, the product is obtained in the form of long, prismatic crystals melting at 185° C. to 187° C. The aqueous suspension colors phenolphthalein intensely red.

4. 498 parts of isophthalic acid and 774 parts of N.N'-ethylene-urea are melted together in an apparatus mainly consisting of glass with ground joints and then heated, while stirring, to 280° C. in the course of 2 hours. At 220° C., the formation of the imidazoline rings sets in, water and carbon dioxide being eliminated. The clear, light-yellow melt gradually becomes, on further heating to 280° C. to 300° C., soluble in dilute acids. After 8 hours' heating to 280° C. to 300° C., the melt, which dissolves in dilute acids to a clear solution, is distilled under reduced pressure, in order to separate therefrom higher condensation products formed. After a first runnings, the 1.3-di-imidazolinyl-2-benzene passes over, under a pressure of 8 mm. at a temperature of 290° C. to 310° C., with a good yield in the form of a colorless compound immediately crystallizing on cooling. The compound is hardly soluble in acetone, ethyl acetate, chloroform, benzene, ether and water, more easily soluble in alcohol, very easily soluble in glacial acetic acid. Recrystallized from alcohol, it is obtained in the form of brilliant scales melting between 234° C. and 235° C. The aqueous suspension of the compound has a strong alkaline action upon phenolphthalein. From the aqueous solutions of its salts, the compound may be reprecipitated by means of alkali.

5. 52.5 parts of benzene-1.3.5-tricarboxylic acid (trimesic acid) are melted together with 129 parts of N.N'-ethylene urea in a metal bath and slowly heated to 280° C. At 240° C. the formation of the imidazoline ring sets in while water and carbon dioxide are split off. After 8 hours' heating to 280° C. the contents of the flask are poured into a basin and pulverized after cooling. A test taken dissolves in dilute acids to a clear solution. In order to separate from the higher condensation products formed the powder obtained is boiled with alcohol. The residue consists of nearly pure 1.3.5-triimidazolinyl-2-benzene. By sublimation under reduced pressure the compound is obtained in the form of colorless prismatic crystals melting at 340° C. The 1.3.5-tri-imidazolinyl-2-benzene is difficultly soluble in water and most organic solvents, and soluble to a small extent in alcohol and pyridine.

6. 20.2 parts of sebacic acid and 25 parts of propylene urea

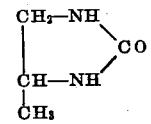

are slowly heated to 320° C. The formation of the imidazoline rings sets in while water and carbon dioxide are split off. After 3 hours' heating at 320° C. the reaction product is distilled under reduced pressure. The omega.omega'-octamethylene-dimethylimidazoline-(2) formed is a mixture of isomerides; it distils between 270° C. and 280° C. under a pressure of 2 mm. in the form of a colorless liquid which solidifies on cooling to a crystalline mass. After recrystallization from acetone or ethyl acetate crystals are obtained which melt at 103° C. The product dissolves in dilute acids to a clear solution and is precipitated from the aqueous solutions of the salts by means of alkalies. The aqueous suspension of the product shows a strongly alkaline reaction.

We claim:

1. The process of preparing compounds containing at least two imidazoline ring systems substituted in 2-position which comprises reacting a compound selected from the group consisting of N.N'-ethylene urea and substituted N.N'-ethylene urea, wherein at least one hydrogen atom of the methylene groups is replaced by a hydrocarbon radical having the general formula:

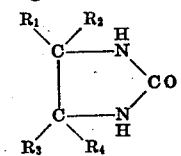

wherein at least one R radical is a hydrocarbon radical and the other R radicals are taken from the class consisting of H and hydrocarbon radicals, with carboxylic acids having a hydrocarbon radical of at least 6 carbon atoms substituted by at least two carboxylic acid groups, but containing no other substituent.

2. The process of preparing compounds containing at least two imidazoline ring systems substituted in 2-position which comprises reacting a compound selected from the group consisting of N.N'-ethylene urea and substituted N.N'-ethylene urea, wherein at least one hydrogen atom of the methylene groups is replaced by a hydrocarbon radical having the general formula:

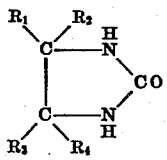

wherein at least one R radical is a hydrocarbon radical and the other R radicals are taken from the class consisting of H and hydrocarbon radicals, with aliphatic carboxylic acids having a hydrocarbon radical of at least 6 carbon atoms substituted by at least two carboxylic acid groups, but containing no other substituents.

3. The process of preparing compounds containing at least two imidazoline ring systems substituted in 2-position which comprises reacting a compound selected from the group consisting of N.N'-ethylene urea and substituted N.N'-ethylene urea, wherein at least one hydrogen atom of the methylene groups is replaced by a hydrocarbon radical having the general formula:

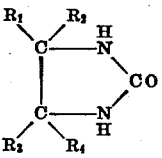

wherein at least one R radical is a hydrocarbon radical and the other R radicals are taken from the class consisting of H and hydrocarbon radicals, with aromatic carboxylic acid having a hydrocarbon radical of at least 8 carbon atoms substituted by at least two carboxylic acid groups, but containing no other substituents.

4. The process of preparing compounds containing at least two imidazoline ring systems substituted in 2-position which comprises heating to a high temperature a compound selected from the group consisting of N.N'-ethylene urea and substituted N.N'-ethylene urea, wherein at least one hydrogen atom of the methylene group is replaced by a hydrocarbon radical having the general formula:

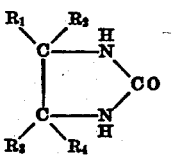

wherein at least one R radical is a hydrocarbon radical and the other R radicals are taken from the class consisting of H and hydrocarbon radicals, with carboxylic acids having a hydrocarbon radical of at least 6 carbon atoms substituted by at least two carboxylic acid groups but containing no other substituents.

5. The process of preparing compounds containing at least two imidazoline ring systems substituted in 2-position which comprises heating to temperatures lying between 200° C. and 320° C. a compound selected from the group consisting of N.N'-ethylene urea and substituted N.N'-ethylene urea, wherein at least one hydrogen atom of the methylene groups is replaced by a hydrocarbon radical having the general formula:

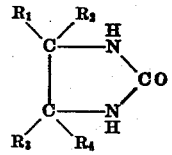

wherein at least one R radical is a hydrocarbon radical and the other R radicals are taken from the class consisting of H and hydrocarbon radicals, with carboxylic acids having a hydrocarbon radical of at least 6 carbon atoms substituted by at least two carboxylic acid groups but containing no other substituents.

6. The process of preparing a compound containing two imidazoline rings connected by an alkylene radical bound to the 2-position of each imidazoline ring which comprises heating to a high temperature N.N'-ethylene urea with an unsubstituted aliphatic dicarboxylic acid containing at least 8 carbon atoms.

7. The process of preparing omega.omega'-octa-methylene-di-imidazoline-(2) which comprises heating to a high temperature N.N'-ethylene urea with sebacic acid.

8. The process of preparing 1.3-di-imidazoline-(2)-benzene which comprises heating to a high temperature N.N'-ethylene urea with isophthalic acid.

9. The process of preparing omega.omega'-octamethylene-di-methylimidazoline-(2) which comprises heating to a high temperature N.N'-propylene urea with sebacic acid.

10. The product of the formula

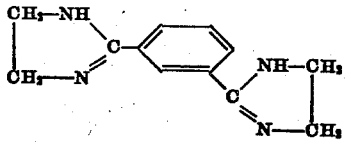

11. The products of the formula

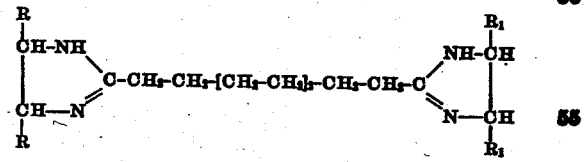

wherein one R and one R₁ means hydrogen and the other R and the other R₁ stand for the methyl group.

GEORG KRÄNZLEIN.
HERBERT BESTIAN.